July 6, 1943.   G. A. TINNERMAN   2,323,690
FASTENING DEVICE
Original Filed March 24, 1939

INVENTOR.
George A. Tinnerman,
BY
Bates, Teare & McBean,
Attorneys.

Patented July 6, 1943

2,323,690

UNITED STATES PATENT OFFICE 2,323,690

FASTENING DEVICE

George A. Tinnerman, Cleveland, Ohio, assignor to Tinnerman Products, Inc., Cleveland, Ohio, a corporation of Ohio Original application March 24, 1939, Serial No. 263,874. Divided and this application November 24, 1942, Serial No. 466,734

2 Claims. (Cl. 85—36)

This invention relates to fasteners and particularly to those which are made of sheet metal and that are adapted for use in holding two or more articles together. The invention is useful in connection with a fastener that is intended for use in a blind location, that is, where an operator cannot readily hold a nut while he is inserting a bolt into it. Heretofore, reliance has been placed upon extraneous means, such as rivets or other kindred devices for holding the fastener in place, but there are many instances, particularly in automotive assembly, where sheet metal fasteners are desirable in blind locations, but where it is impractical to hold them in a satisfactory manner by means of extraneous devices.

An object of the present invention therefore is to make a sheet metal fastener in such manner that when it is applied to a part having a bolt receiving aperture in a blind location it will automatically hold itself in bolt receiving position on the part, thereby enabling the bolt to be inserted without requiring the operator to hold the fastener while the bolt is being threaded into it. An additional object is to make a sheet metal fastener which will operate to hold an article other than a bolt and which will be retained automatically in article receiving position upon a support.

The present application is a division of my pending application 263,874, for a Fastening device, filed March 24, 1939.

Figure 1:
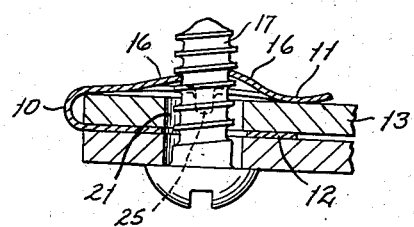
Figure 2:
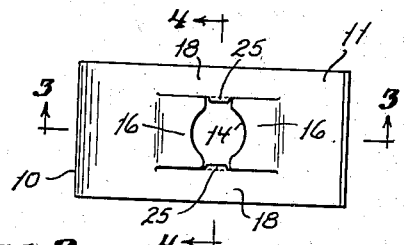
Figure 3:
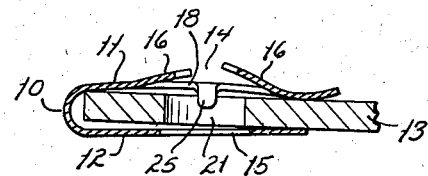
Figure 4:
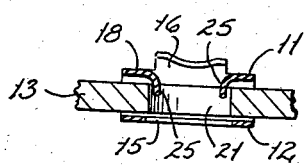

Referring now to the drawing, Fig. 1 is a vertical section longitudinally through the mid-region of my fastener in position embracing a member which is clamped to another member by a screw engaging the fastener; Fig. 2 is a plan of the fastener; Fig. 3 is a longitudinal section of the fastener on the line 3—3 on Fig. 2, showing also a portion of the member embraced thereby; Fig. 4 is a cross section of the fastener on the line 4—4 on Fig. 2.

The fastener is shown as a strip of sheet metal which is bent inwardly at 10 to provide two arms, one of which is indicated at 11 and the other at 12. The arms may be spaced apart a distance that corresponds to the thickness of the part or support 13 on which the fastener is intended for use. Additionally, the arm 11 may have an aperture 14 therein for receiving the shank of a bolt or similar device while the arm 12 may have an aperture 15 in registration with the opening 14 and through which the shank of a fastener 17 (Fig. 1) may extend. The opening 15 is adapted to clear the shank of the bolt but that part of the arm adjacent the opening 14 has a thread follower associated therewith.

The thread-engaging portion of the fastener comprises a pair of opposed tongues 16 which are formed integrally with the arm 11 and extend out of the plane thereof in oppositely inclined directions. The thickness of the metal of which the fastener is formed is preferably uniform throughout its length and is less than the pitch of the thread on a bolt with which it is intended to be used. Accordingly, the tongues 16 are deformed to correspond to the helix of the bolt thread and fit snugly within the thread, and engage one turn thereof, as shown in Fig. 1.

To position the fastener on the part embraced, I have provided two article-engaging tongues 25, formed on the bridges 18 of the arm 11 and adapted to extend into the opening 21 of the part 13 and lie close to the periphery of such opening, thus positioning the fastener so that the opening 15 in the arm 12 and the opening between the tongues all register with the opening 21. The downwardly extending projections 25 are integral portions of the arm 11, being formed out of the metal which is removed to provide the openings between the ends of the tongues.

A fastener made in accordance with my invention is advantageous in that the article engaging portion is formed from the same arm which has the thread-engaging portion or article engaging portion therein. This simplifies the construction without unduly weakening the holding power of the fastener.

I claim:

1. A fastener for securing a structure provided with a hole through which a screw or the like extends comprising a strip having two arms which are spaced sufficiently to receive a support between them, one of the arms being formed with a pair of integral spring tongues extending diagonally upwardly from the latter arm toward their free ends, said free ends being spaced apart and warped to provide a helical turn and the sides of the tongues being severed from the arm, whereby the two portions of such arm beyond the roots of the tongues are connected by bridge portions at the outer sides of the tongues, and a downward projection on one of the bridge portions formed by turning downwardly a part of the material of the arm in the region between the adjacent ends of the two tongues, said projection being adapted to enter the hole in the structure, thereby to locate the fastener with reference thereto.

2. A fastener for securing a structure provided with a hole through which a screw or the like extends comprising a sheet metal strip formed with a pair of integral spring tongues extending diagonally upwardly from their roots toward their free ends, said free ends being spaced apart and warped to provide a helical turn and the sides of the tongues being severed from the strip while leaving bridge portions at the outer sides of the tongues, and downward integral projections on the bridge portions formed by turning downwardly a part of the material of the strip from the region between the adjacent ends of the two tongues, said projections being adapted to enter the hole in the structure, thereby to hold the fastener against displacement.

GEORGE A. TINNERMAN.